June 16, 1953  A. W. CATLIN  2,642,259
VALVE
Filed Oct. 25, 1947
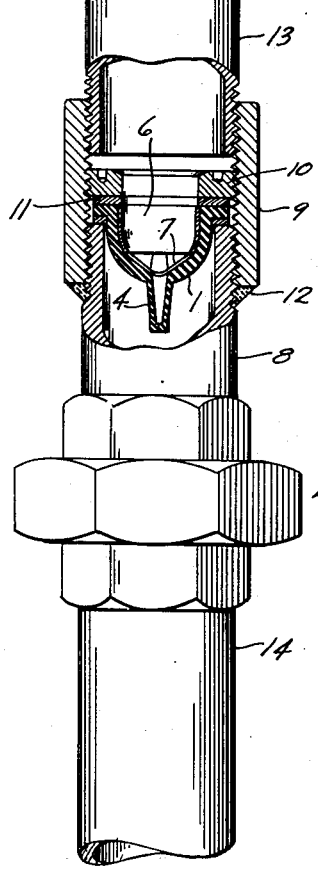
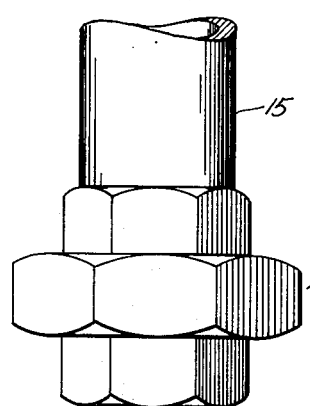
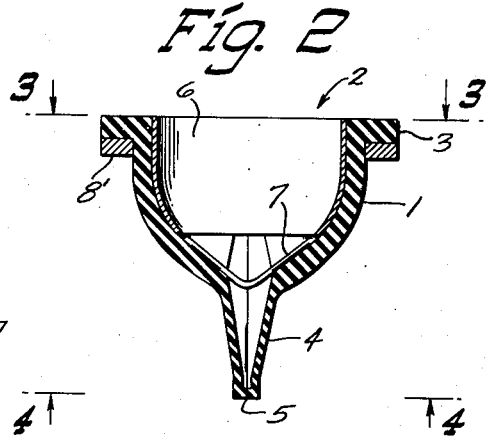
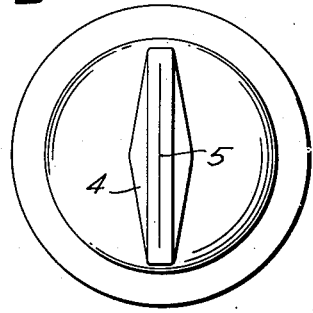
INVENTOR.
Arthur W. Catlin
BY
Arthur R. Woolfolk
Attorney Patented June 16, 1953

2,642,259

UNITED STATES PATENT OFFICE 2,642,259

VALVE

Arthur W. Catlin, Manitowoc, Wis., assignor to Manitowoc Shipbuilding Company, Manitowoc, Wis.

Application October 25, 1947, Serial No. 782,107

4 Claims. (Cl. 251—122)

1

This invention relates to valves.

This application is a continuation in part of my copending application Serial No. 648,191 filed February 16, 1946, now abandoned, for an Agitator, which application is assigned to the same assignee as the present application.

Objects of this invention are to provide a novel form of valve construction in which the valve body is made generally cylindrical or cup-shaped and is of resilient yielding material and is provided with a pair of outwardly projecting lips between which a slit is formed, the inherent resiliency of the material being such as to normally hold the lips together to thus close the slit and to provide a reinforcing means internally of the body portion to prevent collapse or turning inside out of the valve when subjected to pressure on its outer side and to so construct this reinforcing member that it is provided with means acting on the inner base portion of the lips to additionally assist in causing the lips to remain closed except for passage of fluid in a direction from the interior to the exterior of the valve body.

Further specific objects are to provide a novel type of valve which is so constructed that it is very simple and may be relied upon to act as a check valve with a high degree of certainty, which may be readily removed, replaced, or inspected if desired, and to provide a type of valve having the above characteristics which may be adjusted once and for all at the factory, which may be removed as a unit portion of a small section of pipe without disturbing the adjustment of the valve.

An embodiment of the invention is shown in the accompanying drawings, in which:

Figure 1 is an elevation of one form of the invention with parts broken away and parts in section.

Figure 2 is an enlarged sectional view through the valve of Figure 1.

Figure 3 is a top view of the structure shown in Figure 2.

Figure 4 is a bottom view of the structure shown in Figure 2.

Referring to Figures 1 through 4 it will be seen that the valve comprises a cylindrical or cup-shaped body portion 1 of resilient yielding material such, for instance, as rubber or synthetic material and that this body portion is provided with an open end as indicated at 2 and with an annular outwardly projecting flange 3 at the open end of the valve. The valve is provided with a pair of outwardly projecting lips 4 at its other

2 end and a slit indicated at 5 is formed between the lips. A cylindrical and slightly cup-shaped reinforcing rigid member 6 fits within the body of the valve and is open at both ends. This member may be formed of bronze or other material if so desired. It is provided with a rod 7 whose ends are secured at diametrically opposed points to an edge of the reinforcing member 6. This rod is of rigid material such as bronze, for instance, or other suitable material. It extends transversely with respect to the slit between the lips 4 and bears downwardly against the base portion of the lips thus additionally biasing and forcing the lips together to close the slit.

The valve is mounted within a short section of a pipe 8 and preferably a metal washer 8' is positioned between the flange 3 of the valve and the end of the pipe 8. The pipe 8 has a sleeve 9 screwed thereon and a ring nut 10 is screwed into the sleeve to clamp the flange 3 of the valve in place. If desired, a metal washer 11 may be positioned above the flange 3 to prevent any possible cutting of the valve when the ring nut 10 is tightened. It is preferable to weld or braze the end of the sleeve 9 to the pipe 8 as indicated at 12 so that the fitting consisting of the pipe and sleeve 9 may be attached to another section of pipe 13 without any possible danger of interfering with the adjustment of the valve or damaging the valve. It is preferable to have the pipes 8 and 13 relatively short and to join them respectively to other pipes 14 and 15 by means of unions 16 and 17. The reason for this is to permit ready removal of the short sections of pipes 8 and 13 by merely disconnecting the unions. This allows ready removal, inspection or repair of the valve.

These valves are intended to act as check valves and they are designed to resist air pressure or other fluid pressure for long periods of time without leaking when the direction of flow tends to be in the reverse direction, that is to say, from the outside of the valve towards the inside or upwardly as the valve is positioned in Figure 1. The lips, however, freely separate to allow flow of air or other fluid downwardly, that is to say, from the interior to the outside of the valve. These valves have been found in actual service to prevent leaking when subjected to pressure in the reverse direction for great lengths of time and also have been found to have long wear or life.

When pressure is applied exteriorly of the valve, that is to say, upwardly as viewed in Figure 1, there is no change of the valves turning inside out when the pressure gets relatively high as the reinforcing cylindrical member or somewhat cup-shaped member 6 as well as the transverse rod or wire 7 will resist this tendency. In addition to this the downward pressure of the U-shaped rod or transverse member 7 acting on the inner base portions of the lips 4 biases the lips towards closed position and thus maintains the valve closed in addition to the resiliency of the material which also tends to hold the lips closed.

In the form of the invention just described it is intended that the valve be positioned and adjusted at the factory and that it need not be disturbed when another section of pipe is coupled either to the sleeve 9 or to the short section of pipe 13, the pipe 13 or other pipe that may be screwed into the sleeve 9 being arranged to remain out of contact with the valve so that the valve is not disturbed.

It will be seen that a novel form of valves have been provided which are of very simple structure and which are highly effective in service.

Although this invention has been described in considerable detail, it is to be understood that such description is intended as illustrative rather than limiting, as the invention may be variously embodied and it is to be interpreted as claimed.

I claim:

1. A valve construction comprising a yielding cup-shaped body portion having one end open and having the other end provided with a slit and a pair of lips defining the slit and normally in contact with each other, and a U-shaped rigid member located within said body portion and extending transversely with reference to said slit and bearing against the inner base portions of said lips and biasing the outer ends of said lips towards each other to thereby assist in normally holding said lips together.

2. A valve construction comprising a yielding cup-shaped body portion having one end open and having the other end provided with a slit and a pair of lips defining the slit and normally in contact with each other, said body portion having an outwardly projecting flange surrounding the open end, and a U-shaped rigid member located within said body portion and extending transversely with reference to said slit and bearing against the inner base portions of said lips and biasing the outer ends of said lips towards each other to thereby assist in normally holding said lips together.

3. A valve construction comprising a yielding body portion having one end open and having the other end provided with a slit and a pair of lips defining the slit and normally in contact with each other, an annular rigid reinforcing member open at both ends and located within said body portion, and a U-shaped rigid member secured to said annular member and extending transversely with reference to said slit and bearing against the inner base portions of said lips and biasing the outer ends of said lips towards each other to thereby assist in normally holding said lips together.

4. A valve construction comprising a yielding body portion having one end open and having the other end provided with a slit and a pair of lips defining the slit and normally in contact with each other, said body portion having an outwardly projecting flange surrounding the open end, an annular rigid reinforcing member open at both ends and located within said body portion, and a U-shaped rigid member secured to said annular member and extending transversely with reference to said slit and bearing against the inner base portions of said lips and biasing the outer ends of said lips towards each other to thereby assist in normally holding said lips together.

ARTHUR W. CATLIN.

References Cited in the file of this patent

UNITED STATES PATENTS

| Number | Name | Date |
|---|---|---|
| 354,560 | Levier | Dec. 21, 1886 |
| 903,280 | Farrell | Nov. 10, 1908 |
| 1,641,382 | Goldsmith | Sept. 6, 1927 |
| 1,662,527 | MacDonald | Mar. 13, 1928 |
| 1,827,028 | Malcom | Oct. 13, 1931 |
| 2,026,916 | Smith | Jan. 7, 1936 |
| 2,270,737 | Langdon | Jan. 20, 1942 |
| 2,328,948 | Bourke | Sept. 7, 1943 |
| 2,347,988 | Burke | May 2, 1944 |
| 2,352,642 | Langdon | July 4, 1944 |
| 2,382,427 | Langdon | Aug. 14, 1945 |